(12) United States Patent
Davis et al.

(10) Patent No.: US 11,589,421 B2
(45) Date of Patent: Feb. 21, 2023

(54) DETACHABLE POWER SOURCE FOR AN AEROSOL DELIVERY DEVICE

(71) Applicant: RAI Strategic Holdings, Inc., Winston-Salem, NC (US)

(72) Inventors: Michael F. Davis, Clemmons, NC (US); Percy D. Phillips, Pfafftown, NC (US); James W. Rogers, Cornelius, NC (US); Lisa E. Brown, Lexington, NC (US); James Demopoulos, Durham, NC (US)

(73) Assignee: RAI Strategic Holdings, Inc., Winston-Salem, NC (US)

( * ) Notice: Subject to any disclaimer, the term of this patent is extended or adjusted under 35 U.S.C. 154(b) by 213 days.

(21) Appl. No.: 17/157,277

(22) Filed: Jan. 25, 2021

(65) Prior Publication Data
US 2021/0137171 A1    May 13, 2021

Related U.S. Application Data

(63) Continuation of application No. 15/097,028, filed on Apr. 12, 2016, now Pat. No. 10,945,462.

(51) Int. Cl.
*H05B 1/02* (2006.01)
*B05B 9/00* (2006.01)
(Continued)

(52) U.S. Cl.
CPC .......... *H05B 1/0244* (2013.01); *A24F 40/50* (2020.01); *A24F 40/60* (2020.01); *A24F 40/90* (2020.01);
(Continued)

(58) Field of Classification Search
CPC .. H05B 1/0244; H05B 3/44; H05B 2203/014; A24F 40/10; A24F 40/50; A24F 40/60; A24F 40/90; H02J 50/10; B05B 9/002
See application file for complete search history.

(56) References Cited

U.S. PATENT DOCUMENTS

| 1,771,366 A | 7/1930 | Wyss et al. |
| 2,057,353 A | 10/1936 | Whittemore, Jr. |

(Continued)

FOREIGN PATENT DOCUMENTS

| AU | 276250 | 7/1965 |
| CA | 2 641 869 | 5/2010 |

(Continued)

*Primary Examiner* — Brian W Jennison
(74) *Attorney, Agent, or Firm* — Womble Bond Dickinson (US) LLP

(57) ABSTRACT

An aerosol delivery device having a detachable power source is provided. A control body may be coupleable with a cartridge to form an aerosol delivery device. The cartridge may contain an aerosol precursor composition and be equipped with a heating element configured to activate and vaporize components of the aerosol precursor composition. The control body may comprise a housing and a power source detachably coupled to an outer surface of the housing. A control component may be contained within the housing and configured to operate in an active mode in which the control body is coupled with the cartridge. The control component in the active mode may be configured to direct power from the power source to the heating element to activate and vaporize components of the aerosol precursor composition.

18 Claims, 5 Drawing Sheets

(51) Int. Cl.
*H05B 3/44* (2006.01)
*A24F 40/50* (2020.01)
*A24F 40/90* (2020.01)
*H02J 50/10* (2016.01)
*A24F 40/60* (2020.01)
*A24F 40/10* (2020.01)

(52) U.S. Cl.
CPC .............. *B05B 9/002* (2013.01); *H02J 50/10* (2016.02); *H05B 3/44* (2013.01); *A24F 40/10* (2020.01); *H05B 2203/014* (2013.01)

(56) References Cited

U.S. PATENT DOCUMENTS

| | | | |
|---|---|---|---|
| 2,104,266 A | 1/1938 | McCormick |
| 3,200,819 A | 8/1965 | Gilbert |
| 4,284,089 A | 8/1981 | Ray |
| 4,303,083 A | 12/1981 | Burruss, Jr. |
| 4,735,217 A | 4/1988 | Gerth et al. |
| 4,848,374 A | 7/1989 | Chard et al. |
| 4,907,606 A | 3/1990 | Lilja et al. |
| 4,922,901 A | 5/1990 | Brooks et al. |
| 4,945,931 A | 8/1990 | Gori |
| 4,947,874 A | 8/1990 | Brooks et al. |
| 4,947,875 A | 8/1990 | Brooks et al. |
| 4,986,286 A | 1/1991 | Roberts et al. |
| 5,019,122 A | 5/1991 | Clearman et al. |
| 5,042,510 A | 8/1991 | Curtiss et al. |
| 5,060,671 A | 10/1991 | Counts et al. |
| 5,093,894 A | 3/1992 | Deevi et al. |
| 5,144,962 A | 9/1992 | Counts et al. |
| 5,249,586 A | 10/1993 | Morgan et al. |
| 5,261,424 A | 11/1993 | Sprinkel, Jr. |
| 5,322,075 A | 6/1994 | Deevi et al. |
| 5,353,813 A | 10/1994 | Deevi et al. |
| 5,369,723 A | 11/1994 | Counts et al. |
| 5,372,148 A | 12/1994 | McCafferty et al. |
| 5,388,574 A | 2/1995 | Ingebrethsen |
| 5,408,574 A | 4/1995 | Deevi et al. |
| 5,468,936 A | 11/1995 | Deevi et al. |
| 5,498,850 A | 3/1996 | Das |
| 5,515,842 A | 5/1996 | Ramseyer et al. |
| 5,530,225 A | 6/1996 | Hajaligol |
| 5,564,442 A | 10/1996 | MacDonald et al. |
| 5,649,554 A | 7/1997 | Sprinkel et al. |
| 5,666,977 A | 9/1997 | Higgins et al. |
| 5,687,746 A | 11/1997 | Rose et al. |
| 5,726,421 A | 3/1998 | Fleischhauer et al. |
| 5,727,571 A | 3/1998 | Meiring et al. |
| 5,743,251 A | 4/1998 | Howell et al. |
| 5,768,371 A | 6/1998 | Snyder |
| 5,799,663 A | 9/1998 | Gross et al. |
| 5,819,756 A | 10/1998 | Mielordt |
| 5,865,185 A | 2/1999 | Collins et al. |
| 5,865,186 A | 2/1999 | Volsey, II |
| 5,878,752 A | 3/1999 | Adams et al. |
| 5,894,841 A | 4/1999 | Voges |
| 5,934,289 A | 8/1999 | Watkins et al. |
| 5,954,979 A | 9/1999 | Counts et al. |
| 5,967,148 A | 10/1999 | Harris et al. |
| 6,040,560 A | 3/2000 | Fleischhauer et al. |
| 6,053,176 A | 4/2000 | Adams et al. |
| 6,089,857 A | 7/2000 | Matsuura et al. |
| 6,095,153 A | 8/2000 | Kessler et al. |
| 6,104,292 A | 8/2000 | Rombom et al. |
| 6,125,853 A | 10/2000 | Susa et al. |
| 6,155,268 A | 12/2000 | Takeuchi |
| 6,164,287 A | 12/2000 | White |
| 6,196,218 B1 | 3/2001 | Voges |
| 6,196,219 B1 | 3/2001 | Hess et al. |
| 6,598,607 B2 | 7/2003 | Adiga et al. |
| 6,601,776 B1 | 8/2003 | Oljaca et al. |
| 6,615,840 B1 | 9/2003 | Fournier et al. |
| 6,688,313 B2 | 2/2004 | Wrenn et al. |
| 6,772,756 B2 | 8/2004 | Shayan |
| 6,803,545 B2 | 10/2004 | Blake et al. |
| 6,854,461 B2 | 2/2005 | Nichols |
| 6,854,470 B1 | 2/2005 | Pu |
| 7,117,867 B2 | 10/2006 | Cox et al. |
| 7,293,565 B2 | 11/2007 | Griffin et al. |
| 7,513,253 B2 | 4/2009 | Kobayashi et al. |
| 7,775,459 B2 | 8/2010 | Martens, III et al. |
| 7,832,410 B2 | 11/2010 | Hon |
| 7,845,359 B2 | 12/2010 | Montaser |
| 7,896,006 B2 | 3/2011 | Hamano et al. |
| 8,127,772 B2 | 3/2012 | Montaser |
| 8,314,591 B2 | 11/2012 | Terry et al. |
| 8,365,742 B2 | 2/2013 | Hon |
| 8,402,976 B2 | 3/2013 | Fernando et al. |
| 8,499,766 B1 | 8/2013 | Newton |
| 8,528,569 B1 | 9/2013 | Newton |
| 8,550,069 B2 | 10/2013 | Alelov |
| 8,851,081 B2 | 10/2014 | Fernando et al. |
| 2002/0146242 A1 | 10/2002 | Vieira |
| 2003/0226837 A1 | 12/2003 | Blake et al. |
| 2004/0118401 A1 | 6/2004 | Smith et al. |
| 2004/0129280 A1 | 7/2004 | Woodson et al. |
| 2004/0200488 A1 | 10/2004 | Felter et al. |
| 2004/0226568 A1 | 11/2004 | Takeuchi et al. |
| 2005/0016550 A1 | 1/2005 | Katase |
| 2006/0016453 A1 | 1/2006 | Kim |
| 2006/0196518 A1 | 9/2006 | Hon |
| 2007/0074734 A1 | 4/2007 | Braunshteyn et al. |
| 2007/0102013 A1 | 5/2007 | Adams et al. |
| 2007/0215167 A1 | 9/2007 | Crooks et al. |
| 2008/0085103 A1 | 4/2008 | Beland et al. |
| 2008/0092912 A1 | 4/2008 | Robinson et al. |
| 2008/0257367 A1 | 10/2008 | Paterno et al. |
| 2008/0276947 A1 | 11/2008 | Martzel |
| 2008/0302374 A1 | 12/2008 | Wengert et al. |
| 2009/0095311 A1 | 4/2009 | Hon |
| 2009/0095312 A1 | 4/2009 | Heibrich et al. |
| 2009/0126745 A1 | 5/2009 | Hon |
| 2009/0188490 A1 | 7/2009 | Hon |
| 2009/0230117 A1 | 9/2009 | Fernando et al. |
| 2009/0272379 A1 | 11/2009 | Thorens et al. |
| 2009/0283103 A1 | 11/2009 | Nielsen et al. |
| 2009/0320863 A1 | 12/2009 | Fernando et al. |
| 2010/0043809 A1 | 2/2010 | Magnon |
| 2010/0083959 A1 | 4/2010 | Siller |
| 2010/0200006 A1 | 8/2010 | Robinson et al. |
| 2010/0229881 A1 | 9/2010 | Hearn |
| 2010/0242974 A1 | 9/2010 | Pan |
| 2010/0239903 A1 | 11/2010 | Farquharson |
| 2010/0307518 A1 | 12/2010 | Wang |
| 2010/0313901 A1 | 12/2010 | Fernando et al. |
| 2011/0005535 A1 | 1/2011 | Xiu |
| 2011/0011396 A1 | 1/2011 | Fang |
| 2011/0036363 A1 | 2/2011 | Urtsev et al. |
| 2011/0036365 A1 | 2/2011 | Chong et al. |
| 2011/0094523 A1 | 4/2011 | Thorens et al. |
| 2011/0126848 A1 | 6/2011 | Zuber et al. |
| 2011/0155153 A1 | 6/2011 | Thorens et al. |
| 2011/0155718 A1 | 6/2011 | Greim et al. |
| 2011/0168194 A1 | 7/2011 | Hon |
| 2011/0265806 A1 | 11/2011 | Alarcon et al. |
| 2011/0309157 A1 | 12/2011 | Yang et al. |
| 2012/0042885 A1 | 2/2012 | Stone et al. |
| 2012/0060853 A1 | 3/2012 | Robinson et al. |
| 2012/0111347 A1 | 5/2012 | Hon |
| 2012/0132643 A1 | 5/2012 | Choi et al. |
| 2012/0227752 A1 | 9/2012 | Alelov |
| 2012/0231464 A1 | 9/2012 | Yu et al. |
| 2012/0260927 A1 | 10/2012 | Liu |
| 2012/0279512 A1 | 11/2012 | Hon |
| 2012/0318882 A1 | 12/2012 | Abehasera |
| 2013/0037041 A1 | 2/2013 | Worm et al. |
| 2013/0056013 A1 | 3/2013 | Terry et al. |
| 2013/0081625 A1 | 4/2013 | Rustad et al. |
| 2013/0081642 A1 | 4/2013 | Safari |
| 2013/0192619 A1 | 8/2013 | Tucker et al. |
| 2013/0255702 A1 | 10/2013 | Griffith, Jr. et al. |
| 2013/0306084 A1 | 11/2013 | Flick |
| 2013/0319439 A1 | 12/2013 | Gorelick et al. |

(56) References Cited

U.S. PATENT DOCUMENTS

| | | |
|---|---|---|
| 2013/0340750 A1 | 12/2013 | Thorens et al. |
| 2013/0340775 A1 | 12/2013 | Juster et al. |
| 2014/0000638 A1 | 1/2014 | Sebastian et al. |
| 2014/0060554 A1 | 3/2014 | Collett et al. |
| 2014/0060555 A1 | 3/2014 | Chang et al. |
| 2014/0096781 A1 | 4/2014 | Sears et al. |
| 2014/0096782 A1 | 4/2014 | Ampolini et al. |
| 2014/0109921 A1 | 4/2014 | Chen |
| 2014/0157583 A1 | 6/2014 | Ward et al. |
| 2014/0209105 A1 | 7/2014 | Sears et al. |
| 2014/0253144 A1 | 9/2014 | Novak et al. |
| 2014/0261408 A1 | 9/2014 | Depiano et al. |
| 2014/0261486 A1 | 9/2014 | Potter et al. |
| 2014/0261487 A1 | 9/2014 | Chapman et al. |
| 2014/0261495 A1 | 9/2014 | Novak et al. |
| 2014/0270727 A1 | 9/2014 | Ampolini et al. |
| 2014/0270729 A1 | 9/2014 | Depiano et al. |
| 2014/0270730 A1 | 9/2014 | Depiano et al. |
| 2014/0345631 A1 | 11/2014 | Bowen et al. |
| 2015/0007838 A1 | 1/2015 | Fernando et al. |
| 2015/0053217 A1 | 2/2015 | Steingraber et al. |
| 2015/0164138 A1 | 6/2015 | Liu |
| 2015/0208730 A1 | 7/2015 | Li et al. |
| 2016/0037826 A1 | 2/2016 | Hearn et al. |
| 2016/0073695 A1 | 3/2016 | Sears et al. |
| 2016/0345629 A1 | 12/2016 | Mironov |
| 2017/0202266 A1 | 7/2017 | Sur |

FOREIGN PATENT DOCUMENTS

| | | |
|---|---|---|
| CN | 1541577 | 11/2004 |
| CN | 2719043 | 8/2005 |
| CN | 200997909 | 1/2008 |
| CN | 101116542 | 2/2008 |
| CN | 101176805 | 5/2008 |
| CN | 201379072 | 1/2010 |
| CN | 203676144 | 7/2014 |
| CN | 203789137 | 8/2014 |
| CN | 203861170 | 12/2015 |
| CN | 204861170 U | 12/2015 |
| CN | 205005903 | 2/2016 |
| DE | 10 2006 004 484 | 8/2007 |
| DE | 102006041042 | 3/2008 |
| DE | 20 2009 010 400 | 11/2009 |
| EP | 0 295 122 | 12/1988 |
| EP | 0 430 566 | 6/1991 |
| EP | 0 845 220 | 6/1998 |
| EP | 1 618 803 | 1/2006 |
| EP | 2 316 286 | 5/2011 |
| EP | 2 904 915 | 8/2015 |
| GB | 2469850 | 11/2010 |
| GB | 2529919 | 3/2016 |
| JP | 2016-509481 A | 3/2016 |
| RU | 2608689 | 1/2017 |
| RU | 2611489 | 2/2017 |
| WO | WO 1997/48293 | 12/1997 |
| WO | WO 2003/034847 | 5/2003 |
| WO | WO 2004/043175 | 5/2004 |
| WO | WO 2004/080216 | 9/2004 |
| WO | WO 2005/099494 | 10/2005 |
| WO | WO 2007/078273 | 7/2007 |
| WO | WO 2007/131449 | 11/2007 |
| WO | WO 2009/105919 | 9/2009 |
| WO | WO 2009/155734 | 12/2009 |
| WO | WO 2010/003480 | 1/2010 |
| WO | WO 2010/045670 | 4/2010 |
| WO | WO 2010/073122 | 7/2010 |
| WO | WO 2010/118644 | 10/2010 |
| WO | WO 2010/140937 | 12/2010 |
| WO | WO 2011/010334 | 1/2011 |
| WO | WO 2012/072762 | 6/2012 |
| WO | WO 2012/100523 | 8/2012 |
| WO | WO 2013/089551 | 6/2013 |
| WO | 2014/120479 A1 | 8/2014 |
| WO | WO 2015/086318 | 6/2015 |
| WO | WO 2015/107552 | 7/2015 |
| WO | WO 2017/051011 | 3/2017 |

```
                                    ┌─ 500
                                    ▼

┌─────────────────────────┐
                    │          START          │
                    └─────────────────────────┘
                                 │
                                 ▼
        ┌──────────────────────────────────────────────────┐
        │ DETACHABLY COUPLING A POWER SOURCE TO AN OUTER   │
        │           SURFACE OF THE CONTROL BODY            │
        │                       502                        │
        └──────────────────────────────────────────────────┘
                                 │
                                 ▼
        ┌──────────────────────────────────────────────────┐
        │  DIRECTING POWER FROM THE POWER SOURCE TO THE    │
        │ HEATING ELEMENT TO ACTIVATE AND VAPORIZE         │
        │ COMPONENTS OF THE AEROSOL PRECURSOR COMPOSITION  │
        │                       504                        │
        └──────────────────────────────────────────────────┘
                                 │
                                 ▼
                    ┌─────────────────────────┐
                    │           END           │
                    └─────────────────────────┘
```

FIG. 5

DETACHABLE POWER SOURCE FOR AN AEROSOL DELIVERY DEVICE

CROSS-REFERENCE TO RELATED APPLICATIONS

The present application is a continuation of U.S. patent application Ser. No. 15/097,028, filed Apr. 12, 2016, entitled: *Detachable Power Source for an Aerosol Delivery Device*, the content of which is hereby incorporated by reference.

TECHNOLOGICAL FIELD

The present disclosure relates to aerosol delivery devices such as smoking articles that may utilize electrically generated heat for the production of aerosol (e.g., smoking articles commonly referred to as electronic cigarettes). The smoking articles may be configured to heat the aerosol precursor, which may incorporate materials that may be made or derived from tobacco or otherwise incorporate tobacco, the precursor being capable of forming an inhalable substance for human consumption.

BACKGROUND

Many smoking devices have been proposed through the years as improvements upon, or alternatives to, smoking products that require combusting tobacco for use. Many of those devices purportedly have been designed to provide the sensations associated with cigarette, cigar or pipe smoking, but without delivering considerable quantities of incomplete combustion and pyrolysis products that result from the burning of tobacco. To this end, there have been proposed numerous smoking products, flavor generators and medicinal inhalers that utilize electrical energy to vaporize or heat a volatile material, or attempt to provide the sensations of cigarette, cigar or pipe smoking without burning tobacco to a significant degree. See, for example, the various alternative smoking articles, aerosol delivery devices and heat generating sources set forth in the background art described in U.S. Pat. No. 7,726,320 to Robinson et al. and U.S. Pat. No. 8,881,737 to Collett et al., which are incorporated herein by reference. See also, for example, the various types of smoking articles, aerosol delivery devices and electrically-powered heat generating sources referenced by brand name and commercial source in U.S. Pat. Pub. No. 2015/0216232 to Bless et al., which is incorporated herein by reference. Additionally, various types of electrically powered aerosol and vapor delivery devices also have been proposed in U.S. Pat. Pub. Nos. 2014/0096781 to Sears et al. and 2014/0283859 to Minskoff et al., as well as U.S. patent application Ser. No. 14/282,768 to Sears et al., filed May 20, 2014; Ser. No. 14/286,552 to Brinkley et al., filed May 23, 2014; Ser. No. 14/327,776 to Ampolini et al., filed Jul. 10, 2014; and Ser. No. 14/465,167 to Worm et al., filed Aug. 21, 2014; all of which are incorporated herein by reference.

SUMMARY OF THE DISCLOSURE

The present disclosure relates to aerosol delivery devices, methods of forming such devices, and elements of such devices. The present disclosure thus includes, without limitation, the following example implementations. In some example implementations, a control body is provided that is coupled or coupleable with a cartridge that is equipped with a heating element and contains an aerosol precursor composition. The control body is coupled or coupleable with the cartridge to form an aerosol delivery device in which the heating element is configured to activate and vaporize components of the aerosol precursor composition. The control body comprises a housing and a power source detachably coupled to an outer surface of the housing. The control body also comprises a control component contained within the housing and configured to operate in an active mode in which the control body is coupled with the cartridge. The control component in the active mode is configured to direct power from the power source to the heating element to activate and vaporize components of the aerosol precursor composition.

In some example implementations of the control body of the preceding or any subsequent example implementation, or any combination thereof, the power source is or includes one or more lithium-ion batteries or capacitors, and the control component being configured to direct power from the power source includes being configured to direct power from the one or more lithium-ion batteries or capacitors.

In some example implementations of the control body of any preceding or any subsequent example implementation, or any combination thereof, the power source is a secondary power source, the control body further comprises a primary power source within the housing, and the control component being configured to direct power from the power source includes being configured to switchably direct power from the primary power source or secondary power source.

In some example implementations of the control body of any preceding or any subsequent example implementation, or any combination thereof, the control component being configured to switchably direct power includes being configured to direct power from the primary power source, and switch to the secondary power source only after the primary power source has discharged by at least a threshold amount.

In some example implementations of the control body of any preceding or any subsequent example implementation, or any combination thereof, the power source is coupleable with a charging component configured to charge the power source, and in at least one instance with the power source detached from the outer surface of the housing.

In some example implementations of the control body of any preceding or any subsequent example implementation, or any combination thereof, the power source is coupleable with a charging component configured to charge the power source, and in at least one instance with the power source coupled to the outer surface of the housing.

In some example implementations of the control body of any preceding or any subsequent example implementation, or any combination thereof, the power source being coupleable with the charging component includes being inductively coupleable with the charging component configured to wirelessly charge the power source.

In some example implementations of the control body of any preceding or any subsequent example implementation, or any combination thereof, the power source being coupleable with a radio frequency (RF) transmitter configured to charge the power source with the power source coupled to the outer surface of the housing.

In some example implementations of the control body of any preceding or any subsequent example implementation, or any combination thereof, the power source being coupleable with the charging component includes being coupleable with a charging stand configured to charge the power source with the power source coupled to the outer surface of the housing.

In some example implementations of the control body of any preceding or any subsequent example implementation, or any combination thereof, the control body further comprises a universal serial bus (USB) port coupled to the housing, the power source being detachably, electrically coupleable to the USB port, and the power source being coupleable with the changing stand includes the USB port being coupleable with a USB charging interface of the charging stand.

In some example implementations of the control body of any preceding or any subsequent example implementation, or any combination thereof, the power source is a secondary power source, the control body further comprises a primary power source within the housing, and the control component being configured to direct power from the power source includes being configured to direct power from the primary power source and secondary power source, and the power source being coupleable with the charging stand includes the primary power source and secondary power source being coupleable with the charging stand configured to simultaneously charge the primary power source and secondary power source.

In some example implementations, a method of controlling an aerosol delivery device including a control body coupled with a cartridge that is equipped with a heating element and contains an aerosol precursor composition is provided. The heating element is configured to activate and vaporize components of the aerosol precursor composition. The method includes detachably coupling a power source to an outer surface of the control body. The method also includes directing power from the power source to the heating element to activate and vaporize components of the aerosol precursor composition.

In some example implementations of the method of the preceding or any subsequent example implementation, or any combination thereof, the power source is or includes one or more lithium-ion batteries or capacitors, and directing power from the power source includes directing power from the one-or-more lithium-ion batteries or capacitors In some example implementations of the method of any preceding or any subsequent example implementation, or any combination thereof, the power source is a secondary power source, the control body comprises a primary power source, and directing power from the power source includes switchably directing power from the primary power source or secondary power source.

In some example implementations of the method of any preceding or any subsequent example implementation, or any combination thereof, switchably directing power includes directing power from the primary power source, and switching to the secondary power source only after the primary power source has discharged by at least a threshold amount.

In some example implementations of the method of any preceding or any subsequent example implementation, or any combination thereof, the method further comprises coupling the power source with a charging component configured to charge the power source, and in at least one instance with the power source detached from the outer surface of the housing.

In some example implementations of the method of any preceding or any subsequent example implementation, or any combination thereof, the method further comprises coupling the power source with a charging component configured to charge the power source, and in at least one instance with the power source coupled to the outer surface of the control body.

In some example implementations of the method of any preceding or any subsequent example implementation, or any combination thereof, coupling the power source with the charging component includes inductively coupling the power source with the charging component configured to wirelessly charge the power source.

In some example implementations of the method of any preceding or any subsequent example implementation, or any combination thereof, coupling the power source with the charging component includes wirelessly coupling the power source with a radio frequency (RF) transmitter configured to wirelessly charge the power source.

In some example implementations of the method of any preceding or any subsequent example implementation, or any combination thereof, coupling the power source with the charging component includes coupling the power source with a charging stand configured to charge the power source with the power source coupled to the outer surface of the control body.

In some example implementations of the method of any preceding or any subsequent example implementation, or any combination thereof, a universal serial bus (USB) port is coupled to the control body, and the power source is detachably, electrically coupleable to the USB port, and coupling the power source with the changing stand includes coupling the USB port with a USB charging interface of the charging stand.

In some example implementations of the method of any preceding or any subsequent example implementation, or any combination thereof, the power source is a secondary power source, the control body comprises a primary power source, and directing power from the power source includes directing power from the primary power source and secondary power source, and coupling the power source with the charging stand includes coupling the primary power source and secondary power source with the charging stand configured to simultaneously charge the primary power source and secondary power source.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE FIGURES

Figure 1:
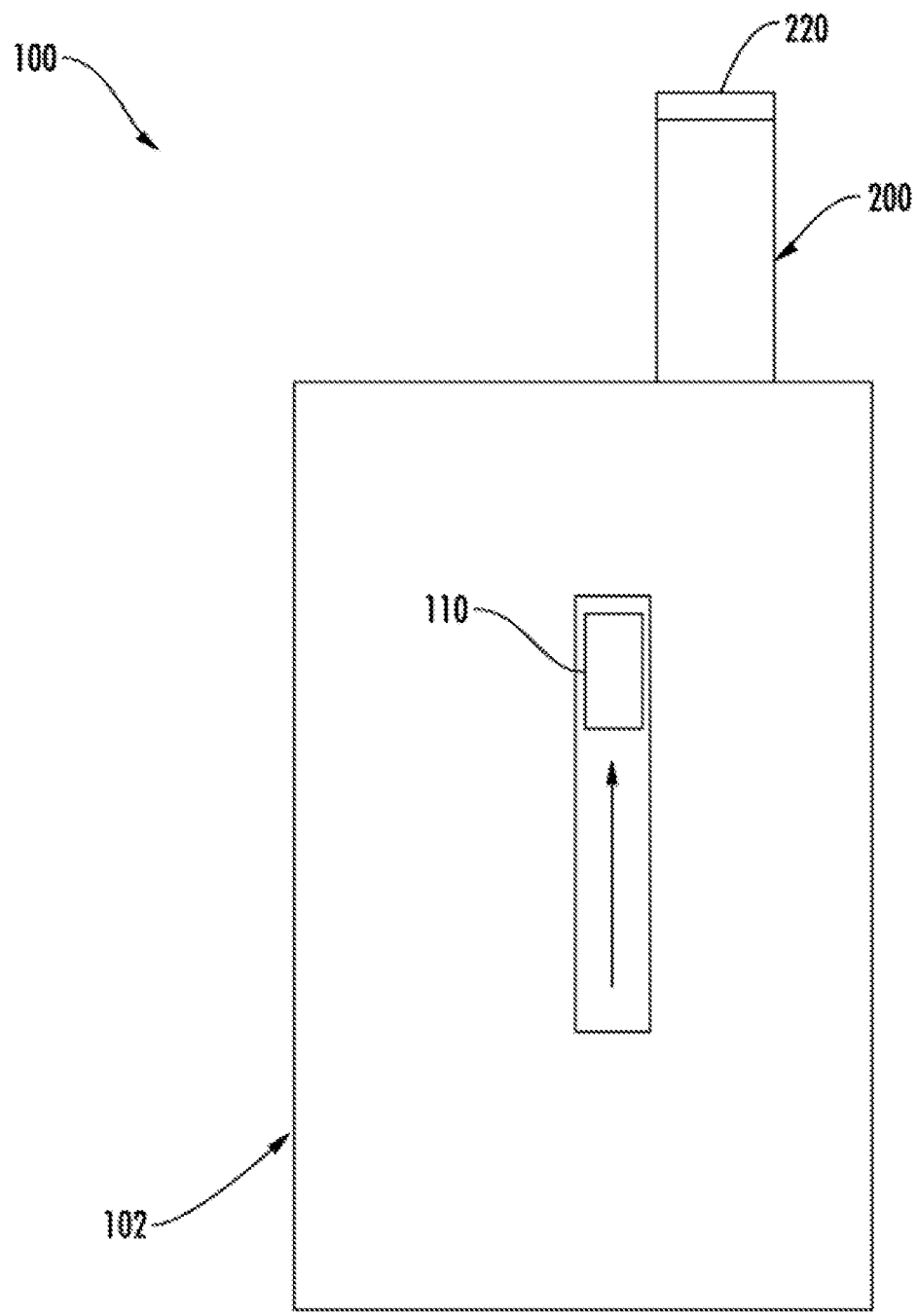
Figure 2:
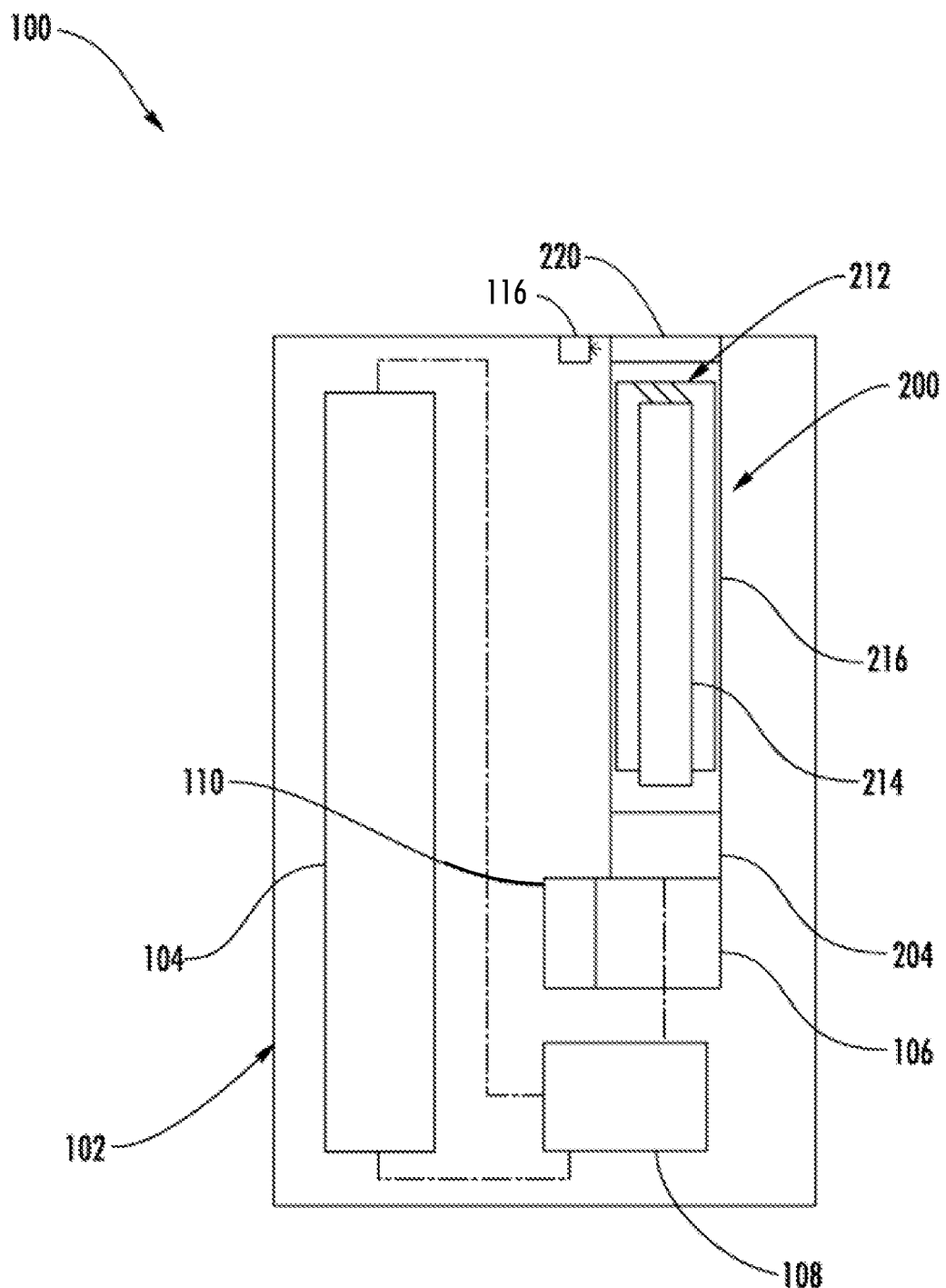
Figure 3:
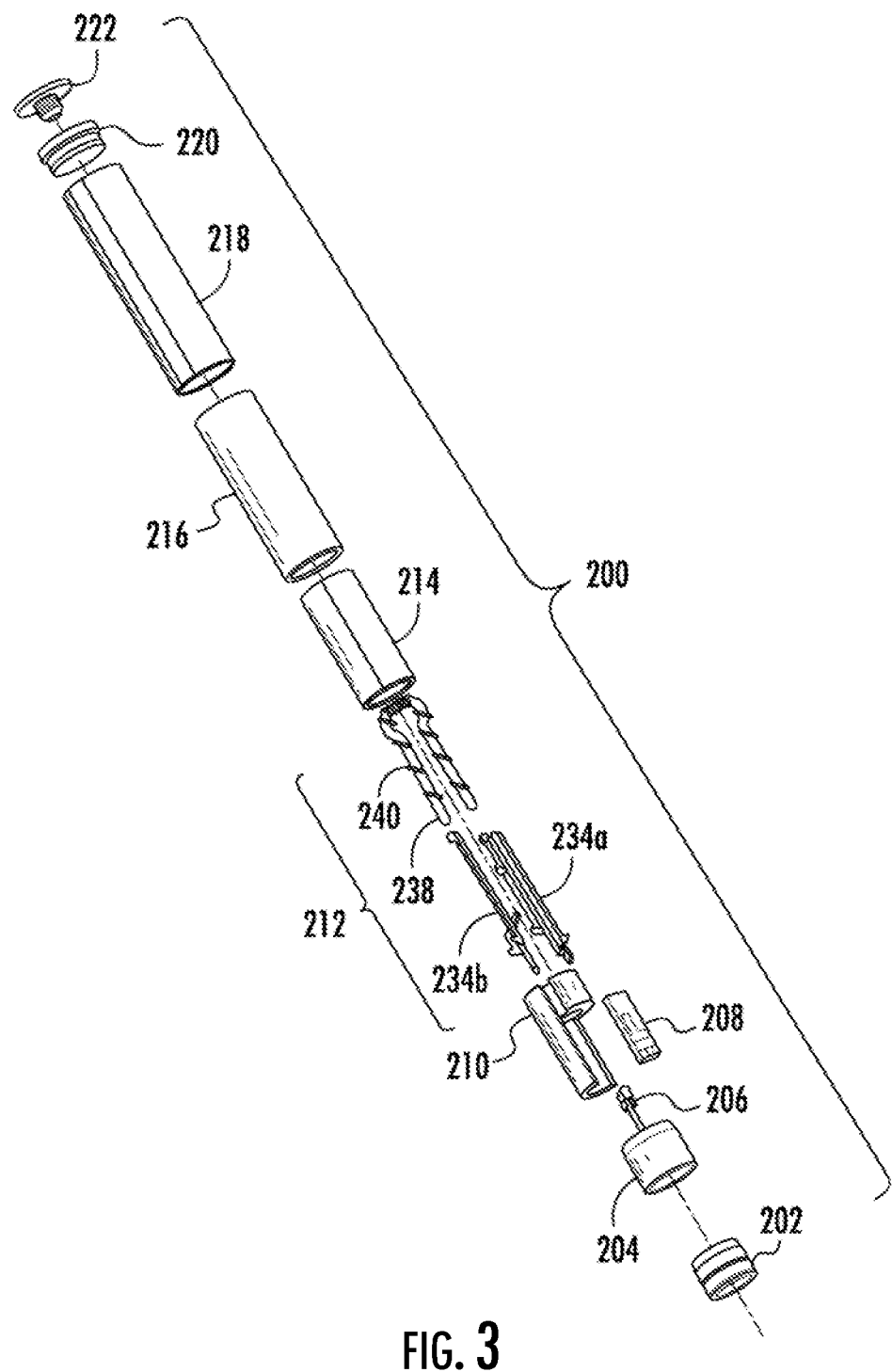
Figure 4:
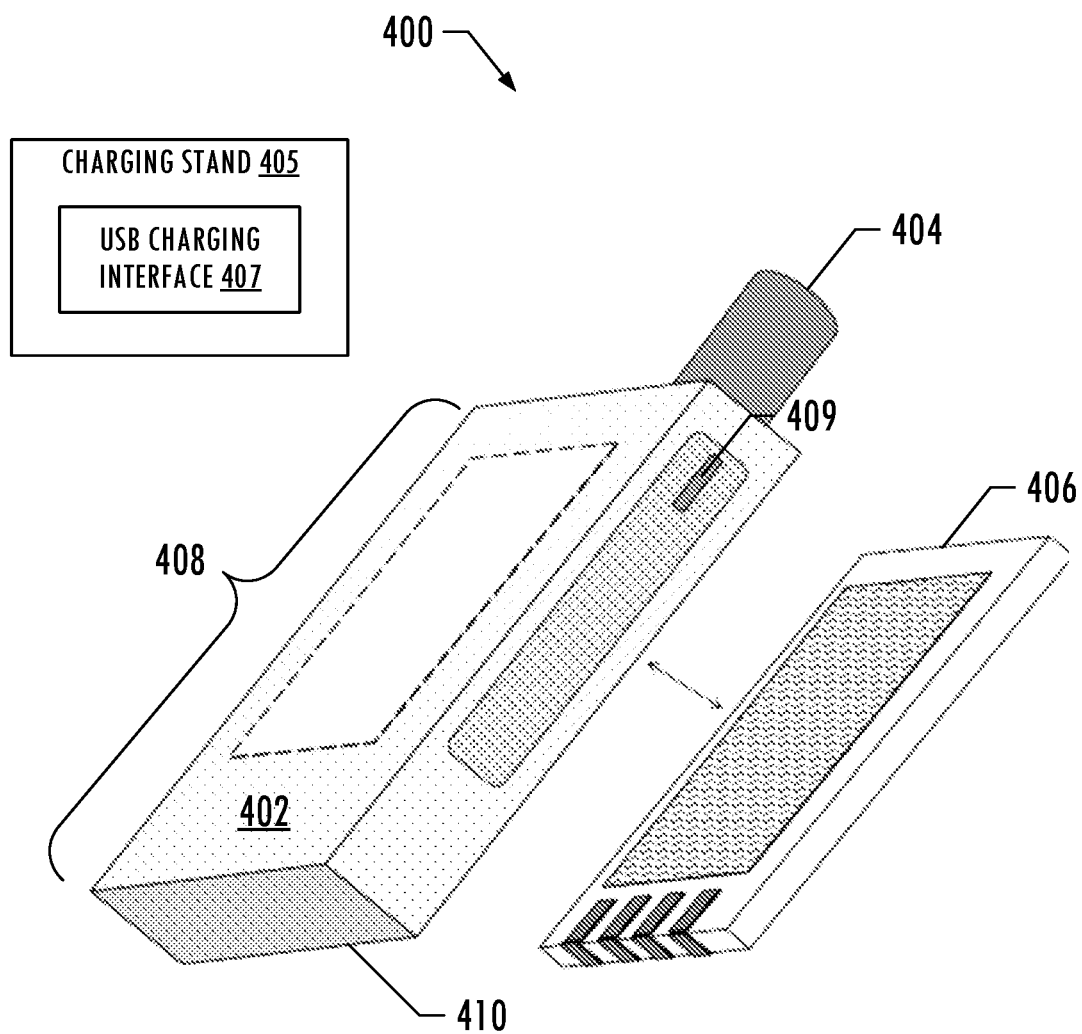

Having thus described the disclosure in the foregoing general terms, reference will now be made to the accompanying drawings, which are not necessarily drawn to scale, and wherein:

FIG. 1 illustrates a front view of an aerosol delivery device including a housing having a cartridge therein, according to an example implementation of the present disclosure;

FIG. 2 schematically illustrates a sectional view through the aerosol delivery device, according to an example implementation;

FIG. 3 illustrates an exploded view of a cartridge suitable for use in the aerosol delivery device, according to an example implementation;

FIG. 4 illustrates an aerosol delivery device having a detachable power source according to an example implementation of the present disclosure; and FIG. 5 illustrates various operations in a method for controlling an aerosol delivery device, according to an example implementation of the present disclosure.

DETAILED DESCRIPTION

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, the singular forms "a," "an," "the" and the like include plural referents unless the context clearly dictates otherwise.

As described hereinafter, example implementations of the present disclosure relate to aerosol delivery systems. Aerosol delivery systems according to the present disclosure use electrical energy to heat a material (preferably without combusting the material to any significant degree) to form an inhalable substance; and components of such systems have the form of articles most preferably are sufficiently compact to be considered hand-held devices. That is, use of components of preferred aerosol delivery systems does not result in the production of smoke in the sense that aerosol results principally from by-products of combustion or pyrolysis of tobacco, but rather, use of those preferred systems results in the production of vapors resulting from volatilization or vaporization of certain components incorporated therein. In some example implementations, components of aerosol delivery systems may be characterized as electronic cigarettes, and those electronic cigarettes most preferably incorporate tobacco and/or components derived from tobacco, and hence deliver tobacco derived components in aerosol form.

Aerosol generating pieces of certain preferred aerosol delivery systems may provide many of the sensations (e.g., inhalation and exhalation rituals, types of tastes or flavors, organoleptic effects, physical feel, use rituals, visual cues such as those provided by visible aerosol, and the like) of smoking a cigarette, cigar or pipe that is employed by lighting and burning tobacco (and hence inhaling tobacco smoke), without any substantial degree of combustion of any component thereof. For example, the user of an aerosol generating piece of the present disclosure can hold and use that piece much like a smoker employs a traditional type of smoking article, draw on one end of that piece for inhalation of aerosol produced by that piece, take or draw puffs at selected intervals of time, and the like.

Aerosol delivery systems of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like.

Aerosol delivery systems of the present disclosure generally include a number of components provided within an outer body or shell, which may be referred to as a housing. The overall design of the outer body or shell can vary, and the format or configuration of the outer body that can define the overall size and shape of the aerosol delivery device can vary. Aerosol delivery devices are often configured in a manner that mimics aspects of certain traditional smoking devices such as cigarettes or cigars. In this regard, aerosol delivery devices typically define a substantially cylindrical configuration. Typically, an elongated body resembling the shape of a cigarette or cigar can be a formed from a single, unitary housing or the elongated housing can be formed of two or more separable bodies. For example, an aerosol delivery device can comprise an elongated shell or body that can be substantially tubular in shape and, as such, resemble the shape of a conventional cigarette or cigar. The aerosol delivery device may alternatively define an ergonomic shape configured to comfortably fit within a user's hand. The shape of the housing, however, is not limited and may be any shape that accommodates the various elements as described herein. In some implementations, the housing of the aerosol delivery device may be expressly non-cylindrical. Aerosol delivery devices often include a control body and a cartridge which attach in an end-to-end relationship to define the substantially cylindrical configuration.

While such configurations may provide a look and feel that is similar to traditional smoking articles, these configurations may suffer from certain detriments. For example, cylindrically-configured aerosol delivery devices may not define attachment points usable to retain the aerosol delivery device in a desired position when not in use. Further, the cylindrical configuration may result in the mouthpiece being exposed to the surrounding environment and therefore susceptible to contamination. Accordingly, it may be desirable to provide aerosol delivery devices in configurations that differ from shapes associated with traditional smoking articles.

In one example, all of the components of the aerosol delivery device are contained within one housing. Alternatively, an aerosol delivery device can comprise two or more housings that are joined and are separable. For example, an aerosol delivery device can possess at one end a control body comprising a housing containing one or more reusable components (e.g., an accumulator such as a rechargeable battery and/or capacitor, and various electronics for controlling the operation of that article), and at the other end and removably coupleable thereto, an outer body or shell containing a disposable portion (e.g., a disposable flavor-containing cartridge).

Aerosol delivery systems of the present disclosure most preferably comprise some combination of a power source (i.e., an electrical power source), at least one control component (e.g., means for actuating, controlling, regulating and ceasing power for heat generation, such as by controlling electrical current flow the power source to other components of the article—e.g., a microprocessor, individually or as part of a microcontroller), a heater or heat generation member (e.g., an electrical resistance heating element or other component, which alone or in combination with one or more further elements may be commonly referred to as an "atomizer"), an aerosol precursor composition (e.g., commonly a liquid capable of yielding an aerosol upon application of sufficient heat, such as ingredients commonly referred to as "smoke juice," "e-liquid" and "e-juice"), and a mouthend region or tip for allowing draw upon the aerosol delivery device for aerosol inhalation (e.g., a defined airflow path through the article such that aerosol generated can be withdrawn therefrom upon draw).

In various examples, an aerosol delivery device can comprise a reservoir configured to retain the aerosol precursor composition. The reservoir particularly can be formed of a porous material (e.g., a fibrous material) and thus may be referred to as a porous substrate (e.g., a fibrous substrate).

A fibrous substrate useful as a reservoir in an aerosol delivery device can be a woven or nonwoven material formed of a plurality of fibers or filaments and can be formed of one or both of natural fibers and synthetic fibers. For example, a fibrous substrate may comprise a fiberglass material a cellulose acetate material, a carbon material, a polyethylene terephthalate (PET) material, a rayon material, or an organic cotton material can be used. A reservoir may be substantially in the form of a container and may include a fibrous material included therein.

In some implementations, the aerosol delivery device can include an indicator, which may comprise one or more light emitting diodes or a graphical user interface via a display. The indicator can be in communication with the control component through a connector circuit and illuminate, for example, during a user draw on the mouthend as detected by the flow sensor.

More specific formats, configurations and arrangements of components within the aerosol delivery systems of the present disclosure will be evident in light of the further disclosure provided hereinafter. Additionally, the selection and arrangement of various aerosol delivery system components can be appreciated upon consideration of the commercially available electronic aerosol delivery devices, such as those representative products referenced in background art section of the present disclosure.

FIG. 1 illustrates a front view of an aerosol delivery device 100, and FIG. 2 illustrates a modified sectional view through the aerosol delivery device, according to an example implementation of the present disclosure. As illustrated, the aerosol delivery device may comprise a housing 102 and a cartridge 200. The cartridge may be moveable with respect to at least a portion of, or an entirety of, the housing. In particular, the cartridge may be moveable relative to at least a portion of the housing between an extended configuration illustrated in FIG. 1, and a retracted configuration illustrated in FIG. 2. Details with respect to the mechanisms and manners associated with movement of the cartridge relative to the housing are described hereinafter.

In some example implementations, one or both of the housing 102 or the cartridge 200 of the aerosol delivery device 100 may be referred to as being disposable or as being reusable. The aerosol delivery device may include various other components disposed within the housing or cartridge or otherwise coupled thereto. These components may be distributed between the housing and the cartridge in any of various manners. For example, the housing may include a replaceable battery or a rechargeable battery and thus may be combined with any type of recharging technology, including connection to a typical alternating current electrical outlet, connection to a car charger (i.e., a cigarette lighter receptacle), connection to a computer, such as through a universal serial bus (USB) cable or connector, wireless connection to a Radio Frequency (RF), wireless connection to induction-based charging pads, or connection to a photovoltaic cell (sometimes referred to as a solar cell) or solar panel of solar cells. Further, in some example implementations, the cartridge may comprise a single-use cartridge, as disclosed in U.S. Pat. No. 8,910,639 to Chang et al., which is incorporated herein by reference in its entirety. Accordingly, it should be understood that the described implementations are provided for example purposes only.

In one example implementation, the housing 102 and cartridge 200 forming the aerosol delivery device 100 may be permanently coupled to one another. Examples of aerosol delivery devices that may be configured to be disposable and/or which may include first and second outer bodies that are configured for permanent coupling are disclosed in U.S. Pat. Pub. No. 2015/0216232 to Bless et al., which is incorporated herein by reference in its entirety. In another example implementation, the housing and cartridge may be configured in a single-piece, non-detachable form and may incorporate the components, aspects, and features disclosed herein. However, in another example implementation, the housing and cartridge may be configured to be separable such that, for example, the cartridge may be refilled or replaced.

By way of example, in the illustrated implementation of FIG. 2, the aerosol delivery device 100 includes a power source 104 positioned within the housing 102. The power source may include, for example, a battery (single-use or rechargeable), supercapacitor or the like. Further, a connector 106 may be moveably attached to the housing. The cartridge 200 may be engaged with the connector so as to be moveable relative to at least a portion of the housing. In some implementations, the cartridge may be removably engaged with the connector and replaceable.

The aerosol delivery device 100 may include a control component 108 received therein. The control component may be configured to direct electrical power from the power source 104 to the cartridge 200 to heat aerosol precursor composition retained in the cartridge to produce a vapor, which may occur during a user draw on a mouthpiece of the cartridge. The control component includes a number of electronic components, and in some examples may be formed of a printed circuit board (PCB) that supports and electrically connects the electronic components. Examples of suitable electronic components include a microprocessor or processor core, an integrated circuit (IC), a memory, and the like. In some examples, the control component may include a microcontroller with an integrated processor core and memory, and which may further include one or more integrated input/output peripherals.

As noted above, the cartridge 200 may be moveable relative to the housing 102. In this regard, the aerosol delivery device 100 may further comprise an actuator 110. In particular, the actuator may be coupled to the connector 106. Thereby, the actuator may be operatively engaged with the cartridge and configured to move the cartridge between the extended configuration and the retracted configuration.

FIG. 3 illustrates a more particular example of the cartridge 200 of FIGS. 1 and 2. As illustrated, the cartridge may comprise a base shipping plug 202, a base 204, a control component terminal 206, an electronic control component 208, a flow tube 210, an atomizer 212, a reservoir 214, an outer body 216, a label 218, the mouthpiece 220, and a mouthpiece shipping plug 222 according to an example implementation of the present disclosure.

As illustrated in FIG. 1, the mouthpiece 220 may be exposed when the cartridge 200 is in the extended configuration. In other words the mouthpiece may be positioned outside of the housing 102 when the cartridge is in the extended configuration such that a user may engage the mouthpiece with his or her lips. Thus, the extended configuration of the cartridge is a configuration in which the aerosol delivery device 100 is configured to receive a draw on the mouthpiece such that the aerosol delivery device may produce and deliver an aerosol to a user in the manner described above.

Conversely, as illustrated in FIG. 2, in the retracted configuration the mouthpiece 220 is relatively closer to the housing 102 than in the extended configuration of FIG. 1. In the retracted configuration, the mouthpiece may be flush with respect to the housing. In other words, an outer surface of the mouthpiece may substantially align with an outer surface of the housing. In another implementation the mouthpiece may be recessed with respect to the housing. In other words, a gap may be provided between the outer surface of the mouthpiece and the outer surface of the housing.

The base 204 may be coupled to a first end of the outer body 216 and the mouthpiece 220 may be coupled to an opposing second end of the outer body to at least partially enclose the remaining components of the cartridge 200 therein, with the exception of the label 218, the mouthpiece shipping plug 222, and the base shipping plug 202. The base may be configured to engage an associated device including a power source 104. In some implementations, the base may comprise anti-rotation features that substantially prevent relative rotation between the cartridge and associated device including the power source. The base shipping plug may be configured to engage and protect the base prior to use of the cartridge. Similarly, the mouthpiece shipping plug may be configured to engage and protect the mouthpiece prior to use of the cartridge.

The control component terminal 206, the electronic control component 208, the flow tube 210, the atomizer 212, and the reservoir substrate 214 may be retained within the outer body 216. The label 218 may at least partially surround the outer body and include information such as a product identifier thereon. The atomizer 212 may comprise a first heating terminal 234a and a second heating terminal 234b, a liquid transport element 238 and a heating element 240.

In some example, a valve may be positioned between the reservoir and the heating element, and configured to control an amount of aerosol precursor composition passed or delivered from the reservoir to the heating element.

The reservoir 214 may be a container or can be a fibrous reservoir, as presently described. For example, the reservoir may comprise one or more layers of nonwoven fibers substantially formed into the shape of a tube encircling the interior of the cartridge 200. An aerosol precursor composition can be retained in the reservoir. Liquid components, for example, can be sorptively retained by the reservoir. The reservoir can be in fluid connection with the liquid transport element 238 adapted to wick or otherwise transport an aerosol precursor composition stored in the reservoir housing to the heating element 240. In particular, the liquid transport element can transport the aerosol precursor composition stored in the reservoir via capillary action to the heating element that is in the form of a metal wire coil in this example. As such, the heating element is in a heating arrangement with the liquid transport element. Example implementations of reservoirs and transport elements useful in aerosol delivery devices according to the present disclosure are further described below, and such reservoirs and/or transport elements can be incorporated into devices such as illustrated in FIG. 3 as described herein. In particular, specific combinations of heating members and transport elements as further described below may be incorporated into devices such as illustrated in FIG. 3 as described herein.

Various examples of materials configured to produce heat when electrical current is applied therethrough may be employed to form the heating element 240. The heating element in these examples may be resistive heating element such as a wire coil. Example materials from which the wire coil may be formed include titanium (Ti), platinum (Pt), nichrome (NiCrFe) Kanthal (FeCrAl), Nichrome, Molybdenum disilicide ($MoSi_2$), molybdenum silicide (MoSi), Molybdenum disilicide doped with Aluminum ($Mo(Si,Al)_2$), graphite and graphite-based materials (e.g., carbon-based foams and yarns), silver palladium (AgPd) conductive inks, boron doped silica, and ceramics (e.g., positive or negative temperature coefficient ceramics). Example implementations of heating elements or heating members useful in aerosol delivery devices according to the present disclosure are further described below, and can be incorporated into devices such as illustrated in FIG. 3 as described herein.

The cartridge 200 may include a flow director defining a non-tubular configuration, an electronics compartment sealed with respect to a reservoir compartment, and/or any of the various other features and components disclosed therein. Accordingly, it should be understood that the particular implementation of the cartridge described herein is provided for example purposes only. In this regard, the cartridge is schematically illustrated in FIG. 2 as including only the outer body 216, the mouthpiece 220, the atomizer 212, the reservoir 214, and the base 204, in light of the various alternate and additional components that may be included therein.

One or more components of the cartridge 200 may be configured to form an electrical connection with the connector 106. For example, referring to the cartridge implementation of FIG. 3, the first heating terminal 234a and the second heating terminal 234b (e.g., positive and negative terminals) at the opposing ends of the heating element 240 are configured to form an electrical connection with the connector. Further, the electronic control component 208 (See FIG. 3) may form an electrical connection with the connector through the control component terminal 206 (See FIG. 3). Components within the housing 102 (e.g., the control component 108) may thus employ the electronic control component to determine whether the cartridge is genuine and/or perform other functions. However, in other implementations the connection between the connector and the cartridge may not be electrical. In other words, the connection between the connector and the cartridge may be purely mechanical. In these implementations, atomization may occur outside of the cartridge or atomization may occur via other methods not requiring electrical connections between the cartridge and the housing such as via piezoelectric or radio frequency atomization. Alternatively, the power source may be positioned in the cartridge such that electrical connection with connector is not required.

In use, when a user draws on the aerosol delivery device 100, the heating element 240 of the atomizer 212 is activated to vaporize components of the aerosol precursor composition. Drawing upon the mouthpiece 220 of the aerosol delivery device causes ambient air to enter and pass through an opening in the connector 106 or in the cartridge 200. In the cartridge, the drawn air combines with the formed vapor to form an aerosol. The aerosol is whisked, aspirated or otherwise drawn away from the heating element and out the opening in the mouthpiece of the aerosol delivery device. However, the flow of air may be received through other parts of the aerosol delivery device in other implementations. As noted above, in some implementations the cartridge may include the flow tube 210. The flow tube may be configured to direct the flow of air to the heating element.

In particular, a sensor in the aerosol delivery device 100 may detect the flow of air throughout the aerosol delivery device. When a flow of air is detected, the control component 108 may direct current to the heating element 240 through a circuit including the first heating terminal 234a and the second heating terminal 234b. Accordingly, the heating element may vaporize the aerosol precursor composition directed to an aerosolization zone from the reservoir 214 by the liquid transport element 238. Thus, the mouthpiece 220 may allow passage of aerosol (i.e., the components of the aerosol precursor composition in an inhalable form) therethrough to a consumer drawing thereon.

Returning to FIG. 2, the aerosol delivery device may further comprise an indicator 116. The indicator may comprise a light transmitter (e.g., plastic or glass, which may be tinted a desired color). Further, the indicator may include a light emitter, which may comprise an incandescent bulb or light emitting diode (LED). Thereby, the light emitter may illuminate the light transmitter, which may direct the light outwardly therethrough to output a status of the aerosol delivery device. The indicator 116 may flash or otherwise illuminate to indicate a remaining or used portion of the capacity of the power source 104 or the reservoir 214.

For example, a relatively large number of flashes of the indicator 116 upon actuation of an input mechanism may correspond to a relatively large remaining capacity of the power source or the reservoir. The input mechanism may comprise a pushbutton or other switch configured to receive an input from a user. When the input mechanism is actuated, the aerosol delivery device may produce an output corresponding to a status of the aerosol delivery device. For example, the aerosol delivery device 100 may output sound, vibration, or light. Conversely, a relatively small number of flashes of the indicator upon actuation of the input mechanism may correspond to a relatively small remaining capacity of the power source or the reservoir. However, the indicator and/or other output mechanisms may be employed to output various other information and/or output information in various other manners. Examples of other information that may be outputted include error messages, operational modes, historical usage information, etc.

In some implementations, the aerosol delivery device 100 may include a display. The display may be provided in addition to, or as an alternate for, the indicator 116. The display may be configured to output various information including information regarding a status of the aerosol delivery device, information unrelated to the status of the aerosol delivery device (e.g., the present time), and/or non-informative graphics (e.g., graphics provided for user entertainment purposes). Thereby, the display may be configured to output any or all of the information described above (e.g., a remaining or used portion of the capacity of the power source 104 or the reservoir 214) in any form such as graphical form and/or a numerical form. Further, in some implementations operation or the display may be controlled by the input mechanism. The display, for example, may be a touchscreen and thus may be configured for user input (e.g. adjustment of power supplied to the heating element(s). In some implementations, the display may provide icons, menus, or the like configured to allow a user to make control selections related to the functioning of the aerosol delivery device, check a specific status of the device, or the like. Although the display is illustrated as encompassing only a relatively small portion of the aerosol delivery device, it is understood that the display may cover a significantly greater portion of the aerosol delivery device.

The various components of an aerosol delivery device 100 according to the present disclosure can be chosen from components described in the art and commercially available. Examples of batteries that can be used according to the disclosure are described in U.S. Pat. App. Pub. No. 2010/0028766 to Peckerar et al., which is incorporated herein by reference in its entirety.

The aerosol delivery device 100 can incorporate the flow sensor or another sensor or detector for control of supply of electric power to the heating element 240 when aerosol generation is desired (e.g., upon draw during use). As such, for example, there is provided a manner or method of turning off the power supply to the heating element when the aerosol delivery device is not be drawn upon during use, and for turning on the power supply to actuate or trigger the generation of heat by the heating element during draw. Additional representative types of sensing or detection mechanisms, structure and configuration thereof, components thereof, and general methods of operation thereof, are described in U.S. Pat. No. 5,261,424 to Sprinkel, Jr., U.S. Pat. No. 5,372,148 to McCafferty et al., and PCT Pat. App. Pub. No. WO 2010/003480 to Flick, all of which are incorporated herein by reference in their entireties.

The aerosol delivery device 100 most preferably incorporates the control component 108 or another control mechanism for controlling the amount of electric power to the heating element 240 during draw. Representative types of electronic components, structure and configuration thereof, features thereof, and general methods of operation thereof, are described in U.S. Pat. No. 4,735,217 to Gerth et al., U.S. Pat. No. 4,947,874 to Brooks et al., U.S. Pat. No. 5,372,148 to McCafferty et al., U.S. Pat. No. 6,040,560 to Fleischhauer et al., U.S. Pat. No. 7,040,314 to Nguyen et al., U.S. Pat. No. 8,205,622 to Pan, U.S. Pat. App. Pub. No. 2009/0230117 to Fernando et al., U.S. Pat. App. Pub. No. 2014/0060554 to Collet et al., U.S. Pat. App. Pub. No. 2014/0270727 to Ampolini et al., and U.S. patent application Ser. No. 14/209,191 to Henry et al., filed Mar. 13, 2014, all of which are incorporated herein by reference in their entireties.

Representative types of substrates, reservoirs or other components for supporting the aerosol precursor are described in U.S. Pat. No. 8,528,569 to Newton, U.S. Pat. App. Pub. No. 2014/0261487 to Chapman et al., U.S. Pat. App. Pub. No. 2015/0059780 to Davis et al., and U.S. Pat. Pub. No. 2015/0216232 to Bless et al., all of which are incorporated herein by reference in their entireties. Additionally, various wicking materials, and the configuration and operation of those wicking materials within certain types of electronic cigarettes, are set forth in U.S. Pat. App. Pub. No. 2014/0209105 to Sears et al., which is incorporated herein by reference in its entirety.

The aerosol precursor composition, also referred to as a vapor precursor composition, may comprise a variety of components including, by way of example, a polyhydric alcohol (e.g., glycerin, propylene glycol or a mixture thereof), nicotine, tobacco, tobacco extract and/or flavorants. Representative types of aerosol precursor components and formulations also are set forth and characterized in U.S. Pat. No. 7,217,320 to Robinson et al. and U.S. Pat. Pub. Nos. 2013/0008457 to Zheng et al.; 2013/0213417 to Chong et al.; 2014/0060554 to Collett et al.; 2015/0020823 to Lipowicz et al.; and 2015/0020830 to Koller, as well as WO 2014/182736 to Bowen et al, the disclosures of which are incorporated herein by reference. Other aerosol precursors that may be employed include the aerosol precursors that have been incorporated in the VUSE® product by R. J. Reynolds Vapor Company, the BLU™ product by Imperial Tobacco Group PLC, the MISTIC MENTHOL product by Mistic Ecigs, and the VYPE product by CN Creative Ltd. Also desirable are the so-called "smoke juices" for electronic cigarettes that have been available from Johnson Creek Enterprises LLC.

Additional representative types of components that yield visual cues or indicators may be employed in the aerosol delivery device 100, such as LEDs and related components, auditory elements (e.g., speakers), vibratory elements (e.g., vibration motors) and the like. Examples of suitable LED components, and the configurations and uses thereof, are described in U.S. Pat. No. 5,154,192 to Sprinkel et al., U.S. Pat. No. 8,499,766 to Newton, U.S. Pat. No. 8,539,959 to Scatterday, and U.S. Pat. Pub. No. 2015/0216233 to Sears et al., all of which are incorporated herein by reference in their entireties.

Yet other features, controls or components that can be incorporated into aerosol delivery devices of the present disclosure are described in U.S. Pat. No. 5,967,148 to Harris et al., U.S. Pat. No. 5,934,289 to Watkins et al., U.S. Pat. No. 5,954,979 to Counts et al., U.S. Pat. No. 6,040,560 to Fleischhauer et al., U.S. Pat. No. 8,365,742 to Hon, U.S. Pat. No. 8,402,976 to Fernando et al., U.S. Pat. App. Pub. No. 2005/0016550 to Katase, U.S. Pat. App. Pub. No. 2010/0163063 to Fernando et al., U.S. Pat. App. Pub. No. 2013/0192623 to Tucker et al., U.S. Pat. App. Pub. No. 2013/0298905 to Leven et al., U.S. Pat. App. Pub. No. 2013/0180553 to Kim et al., U.S. Pat. App. Pub. No. 2014/0000638 to Sebastian et al., U.S. Pat. App. Pub. No. 2014/0261495 to Novak et al., U.S. Pat. App. Pub. No. 2014/0261408 to DePiano et al., and U.S. patent application Ser. No. 14/286,552 to Brinkley et al., all of which are incorporated herein by reference in their entireties.

As previously indicated, the aerosol delivery device 100 may include a power source 104. In example implementations of the present disclosure, this power source or another, secondary power source may be detachably coupled to the control body 102. FIG. 4 illustrates an example of a suitable aerosol delivery device 400 (one example of which may be aerosol delivery device 100 of FIGS. 1 and 2). As shown, the aerosol delivery device may include a control body 402 coupled or coupleable with a cartridge 404 that may correspond respectively to the control body 102 and cartridge 104 of FIGS. 1 and 2. The cartridge may be equipped with a heating element and may contain an aerosol precursor composition. The control body may be coupled or coupleable with the cartridge to form the aerosol delivery device in which the heating element may be configured to activate and vaporize components of the aerosol precursor composition.

More particularly, FIG. 4 illustrates the aerosol delivery device 400 having a detachable power source 406. Accordingly, the control body 402 may comprise a housing 408, and the power source may be detachably coupled to an outer surface 410 of the housing. A control component (e.g., control component 108) may be contained within the housing, and configured to operate in an active mode in which the control body is coupled with the cartridge 404. The control component in the active mode may be configured to direct power from the power source to the heating element of the cartridge to activate and vaporize components of the aerosol precursor composition contained within the cartridge.

In some example implementations, the power source 406 may be or include one or more lithium-ion batteries or capacitors, and the control component of the control body 402 may be configured to direct power from the from the one or more lithium-ion batteries or capacitors to the heating element of the cartridge 404 to activate and vaporize components of the aerosol precursor composition contained within the cartridge. For example, the power source may include a lithium-ion battery power pack which may be can-shaped or in flat format, as shown in FIG. 4.

In some example implementations, the power source 406 is a secondary power source, and the control body 402 further comprises a primary power source (e.g., power source 104) within the housing 408. In these implementations, the control component being configured to direct power from the power source may include being the control component being configured to switchably direct power from the primary power source or secondary power source. Further, in these example implementations, the control component being configured to switchably direct power may include the control component being configured to direct power from the primary power source, and switch to the secondary power source only after the primary power source has discharged by at least a threshold amount. As such, the power source may be implemented as a supplemental power source, to be utilized when the primary power source has been fully discharged, for example. It should be noted, although the power source may be a secondary power source in some example implementations, in other examples, the power source may be utilized as the sole power supply of the aerosol delivery device 400.

In some example implementations, the power source 406 may be coupleable with a charging component configured to charge the power source. In at least one instance, the power source may be coupleable with the charging component and chargeable via the charging component while the power source is detached from the outer surface 410 of the housing 408. In another instance, the power source may be coupleable with the charging component and chargeable via the charging component while the power source coupled with the outer surface of the housing. Examples of suitable charging components include inductive charging component (e.g., wireless charging pad), wireless charging from an RF transmitter, charging stands, USB chargers (e.g., micro-usb charger), and photovoltaic systems (e.g., solar cells).

In some examples, the power source 406 being coupleable with the charging component may include the power source being inductively coupleable with the charging component in which the charging component may be configured to wirelessly charge the power source. In these examples, the power source and the control body 402 may be designed to include a form factor that provides a large surface area, with respect to the power source, for induction-based charging.

In further examples, the power source 406 being coupleable with the charging component may include the power source being coupleable to an RF transmitter in which the charging component may be configured to wirelessly charge the power source. Further, in these implementations, the power source being coupleable with the RF transmitter may include the primary power source and secondary power source being configured to wirelessly receive RF waves as a means of charging the primary power source, secondary power source, or simultaneously both.

In another example, the power source being coupleable with the charging component may include the power source being coupleable with a charging stand in which the charging stand may be configured to charge the power source with the power source coupled to the outer surface 410 of the housing 408. The power source may also be coupleable with a charging stand in which the charging stand may be configured to charge the power source with the power source detached from the outer surface of the housing. For example, the charging stand may be or include a docking station configured to individually and/or collectively charge the power source or control body 402. In these examples, the control body may further comprise a universal serial bus (USB) port coupled to the housing 408 of the control body. The power source 406 may be detachably, electrically coupleable to the USB port. In these example implementations, the power source being coupleable with the changing stand may include the USB port being coupleable with a USB charging interface of the charging stand.

As previously indicated, in some example implementations, the power source 406 is a secondary power source, and the control body 402 further comprises a primary power source (e.g., power source 104) within the housing 408. In these implementations, the control component being configured to direct power from the power source may include the control component being configured to direct power from the primary power source and secondary power source. Further, in these implementations, the power source being coupleable with the changing stand may include the primary power source and secondary power source being coupleable with the charging stand in which the charging stand may be configured to simultaneously charge the primary power source and secondary power source.

FIG. 5 illustrates various operations in a method 500 of controlling an aerosol delivery device according to an example implementation of the present disclosure. The aerosol delivery device may include a control body coupled with a cartridge that is equipped with a heating element and contains an aerosol precursor composition. The heating element may be configured to activate and vaporize components of the aerosol precursor composition. As shown in block 502, the method may include detachably coupling a power source to an outer surface of the control body. As shown at block 504, the method may also include directing power from the power source to the heating element to activate and vaporize components of the aerosol precursor composition.

The foregoing description of use of the article(s) can be applied to the various example implementations described herein through minor modifications, which can be apparent to the person of skill in the art in light of the further disclosure provided herein. The above description of use, however, is not intended to limit the use of the article but is provided to comply with all necessary requirements of disclosure of the present disclosure. Any of the elements shown in the article(s) illustrated in FIGS. 1A-4 or as otherwise described above may be included in an aerosol delivery device according to the present disclosure.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A control body for an aerosol delivery device, the control body comprising:
    a housing;
    a primary power source within the housing;
    a secondary power source detachably coupled to an outer surface of the housing; and
    a microprocessor contained within the housing and configured to cause the aerosol delivery device to produce an aerosol from an aerosol precursor composition, the microprocessor also configured to switchably direct power from the primary power source and the secondary power source to power the aerosol delivery device, including the microprocessor configured to direct power from the primary power source, and switch to the secondary power source only after the primary power source has discharged by at least a threshold amount.

2. The control body of claim 1, wherein the secondary power source is or includes one or more lithium-ion batteries or capacitors, and the microprocessor configured to switch to the secondary power source includes the microprocessor configured to switch to the one or more lithium-ion batteries or capacitors.

3. The control body of claim 1, wherein the secondary power source is coupleable with a charging component configured to charge the secondary power source detached from and coupled to the outer surface of the housing.

4. The control body of claim 3, wherein the secondary power source is inductively coupleable with the charging component configured to wirelessly charge the secondary power source.

5. The control body of claim 3, wherein the secondary power source is wirelessly coupleable with the charging component including a radio frequency (RF) transmitter configured to wirelessly charge the secondary power source.

6. The control body of claim 3, wherein the secondary power source is coupleable with the charging component including a charging stand configured to charge the secondary power source with the secondary power source coupled to the outer surface of the housing.

7. The control body of claim 6 further comprising a universal serial bus (USB) port coupled to the housing, and wherein the secondary power source is detachably, electrically coupleable to the USB port, and the USB port is coupleable with a USB charging interface of the charging stand to thereby couple the secondary power source with the charging stand.

8. The control body of claim 6, wherein the primary power source is also coupleable with the charging stand that is configured to simultaneously charge the primary power source and secondary power source.

9. A method of controlling an aerosol delivery device including a housing within which a primary power source is located, and including a secondary power source detachably coupled to an outer surface of the housing, the method comprising:

causing the aerosol delivery device to produce an aerosol from an aerosol precursor composition; and switchably directing power from the primary power source and the secondary power source to power the aerosol delivery device, including directing power from the primary power source, and switching to the secondary power source only after the primary power source has discharged by at least a threshold amount.

10. The method of claim 9, wherein the secondary power source is or includes one or more lithium-ion batteries or capacitors, and switching to the secondary power source includes switching to the one or more lithium-ion batteries or capacitors.

11. The method of claim 9 further comprising:

coupling the secondary power source with a charging component; and charging the secondary power source with the charging component.

12. The method of claim 11, wherein the secondary power source is detached from the outer surface of the housing when the secondary power source is coupled with the charging component.

13. The method of claim 11, wherein the secondary power source is coupled to the outer surface of the housing when the secondary power source is coupled with the charging component.

14. The method of claim 11, wherein the secondary power source is inductively coupled with the charging component, and the secondary power source is wirelessly charged with the charging component.

15. The method of claim 11, wherein the secondary power source is wirelessly coupled with the charging component including a radio frequency (RF) transmitter, and the secondary power source is wirelessly charged with the RF transmitter.

16. The method of claim 11, wherein the secondary power source is coupled with the charging component including a charging stand, and the secondary power source is charged with the charging stand with the secondary power source coupled to the outer surface of the housing.

17. The method of claim 16, wherein the aerosol delivery device includes a universal serial bus (USB) port to which the secondary power source is detachably, electrically coupled, and wherein the USB port is coupled with a USB charging interface of the charging stand to thereby couple the secondary power source with the charging component.

18. The method of claim 16 further comprising coupling the primary power source with the charging component including the charging stand with which both the primary power source and the secondary power source simultaneously charged.

* * * * *